United States Patent [19]
Christiansen et al.

[11] 3,936,257
[45] Feb. 3, 1976

[54] CLOSED STROKE MOLDING

[75] Inventors: Keith W. Christiansen, Fox River Grove; Kare Andersen, Elgin, both of Ill.

[73] Assignee: Chicago Rawhide Manufacturing Company, Elgin, Ill.

[22] Filed: June 22, 1971

[21] Appl. No.: 155,469

[52] U.S. Cl. .......... 425/125; 425/DIG. 47; 425/127
[51] Int. Cl.² .......................................... B29H 9/10
[58] Field of Search ............ 425/DIG. 47, 127, 423, 425/125

[56] References Cited
UNITED STATES PATENTS

| | | | |
|---|---|---|---|
| 3,122,787 | 3/1964 | Adams .......................... | 425/423 X |
| 3,315,316 | 4/1967 | Baney ......................... | 425/DIG. 47 |
| 3,392,226 | 7/1968 | McKinven, Jr. ............. | 425/DIG. 47 |
| 3,475,790 | 11/1969 | Bush et al. .................. | 425/DIG. 47 |
| 3,536,806 | 10/1970 | Jackson ...................... | 425/DIG. 47 |

*Primary Examiner*—Richard B. Lazarus
*Attorney, Agent, or Firm*—James T. FitzGibbon

[57] ABSTRACT

An apparatus and method for molding an article such as finished seal of known type, comprising a flexible member bonded to a rigid element. During conventional manufacture, the rigid element is clamped between upper and lower seal-forming molding elements and, in many instances, after engagement of the rigid element, continued traveling of the upper and lower molding elements toward each other is used to provide a "closed stroke". In the closed stroke operation of the present invention, the continued traveling in the closed stroke stage requires no substantial deformation or shaping of the rigid element.

An apparatus and method is disclosed in which the molding elements include an outer movable, biased, annular casing engaging element, for example a ring, which is biased in an extended position. The ring is retractable against the bias during the continued travel of the molding elements in the closed stroke. The distance of relative travel of the retractable floating member is the distance of the closed stroke. In a particularly advantageous embodiment, the retraction of the floating element is utilized to even greater advantage in an apparatus which also provides a vacuum assist in filling the seal-shaping mold cavity, and which provides automatic protection of the vacuum system in the final stages of the filling of the mold cavity.

3 Claims, 3 Drawing Figures

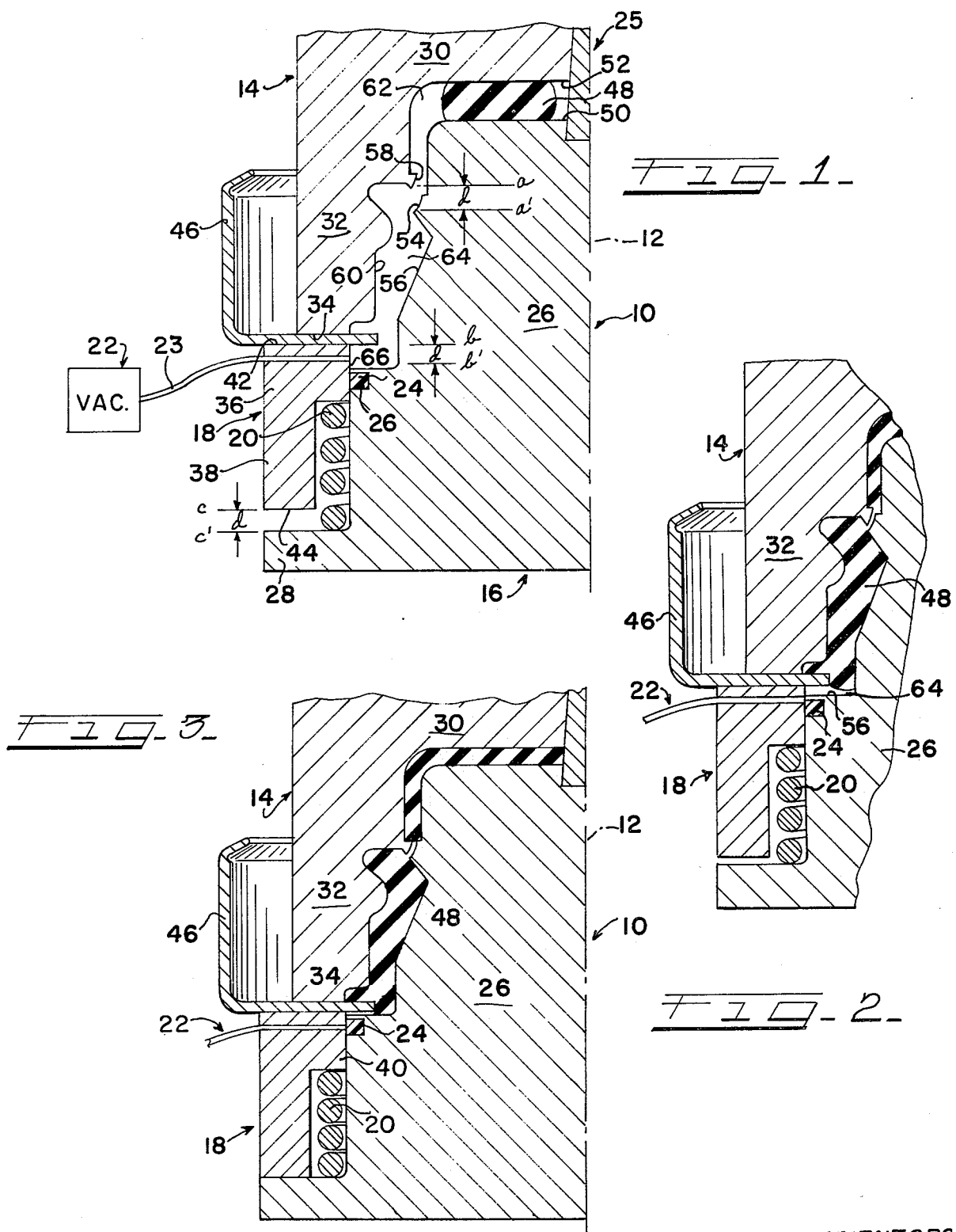

CLOSED STROKE MOLDING

The present invention relates to a new and improved molding apparatus and method which is generally useful in manufacturing an article which comprises a flexible portion directly bonded to a rigid, usually metal portion, for example, window or glass wipers. However, the invention is particularly advantageous for forming oil seals of known type. More specifically, the present invention is advantageously utilized in forming a finished seal which comprises a flexible sealing member bonded to a seal casing. Such seals are highly successful as oil seals for example, and are in widespread use and are manufactured, literally by the millions, in many types, shapes and sizes. In the following illustrated description of the invention, the invention will be specifically described in connection with the manufacture of such shaft seals.

The apparatus and method of this invention provides for complete forming of the seal in a single step molding operation. Although the method and apparatus is useful in connection with both injection and transfer molding operations, it is particularly advantageous for use in those molding operations which are referred to in the industry as closed stroke. In closed stroke molding, for example, an annular casing is engaged between annular upper and lower plate elements of upper and lower seal-forming mold assemblies to close, that is, to seal a mold cavity therebetween in which the sealing element is shaped. However, for reasons of great practical significance with respect to the precise and complete shaping of the seal element, the travel of the upper and lower molding elements continues at least a short distance after the seal-forming cavity is sealed, and in so doing, the stamping is deformed, shaped, coined, bent, or otherwise distorted, and this reshaping is used to advantage in preventing the formation of flash.

However, it is an object of the present invention to provide an apparatus and method for closed stroke molding which not only assures sealing engagement between the seal molding assemblies and the casing, and provides for substantial travel distance after the shaping cavity is sealed, but does so without requiring deflection, coining or other distortion or reshaping of the casing thereby eliminating dimensional change of the stamping or other rigid element.

It is another object of the present invention to provide a molding apparatus and method in which the trapped gas, typically air, which is sealed within the mold cavity is removed quickly by vacuum assist means to facilitate the distribution of the "prep", that is the rubber or rubber-like stock material, into the mold cavity. It is a further object of the present invention to provide such a vacuum assist means which automatically assures that the gas conduit through which the cavity is evacuated will not be plugged by the prep.

It is another object of the present invention to provide a new and improved apparatus for forming a bonded article such as a shaft-type seal, and in particular for forming the flexible portion thereof, which method is readily adapted to the manufacture of "flashless", trimless products.

In accordance with the present invention a casing is engaged between seal-forming assemblies by a casing-engaging system in which at least one casing-engaging element is a floating element biased in an extended position, and which is retractable under the closing force or loading of the seal-forming assembly. The force is great enough to substantially seal the mold cavity at the interfaces between the casing and the upper and lower mold elements. The continued relative travel of the upper and lower seal-forming elements terminates when the floating element bottoms out, thus establishing the precise predetermined desired configuration of the seal element. In a particularly preferred embodiment, a gas conduit connected with a vacuum means passes through the floating element and, when the element is in an extended position, the conduit enters the seal-forming enclosure through an inner face of the floating element at a point which is extended after the stroke is closed but which is retracted near the end of the closed stroke.

Hence, the above objects and other objects which will be apparent hereinafter are all achieved in accordance with the present invention which is described in general, and in connection with a particularly preferred embodiment with the aid of the accompanying drawings in which:

FIG. 1 is a schematic cross-sectional fragmentary elevational view of a seal-forming molding assembly, in accordance with this invention, in a semi-closed position;

FIG. 2 is a fragmentary elevational cross-sectional view of the seal-forming molding assembly shown in FIG. 1, in a position in which a closed stroke is in progress;

FIG. 3 is a fragmentary elevational cross-sectional view of the seal-forming molding assembly shown in FIG. 1 in a fully closed position.

Referring now specifically to FIG. 1, a portion of the molding apparatus in accordance with the present invention is generally indicated at 10. Broken line 12 indicates a vertical center line, and the illustration of FIG. 1 represents the left half of a cross-sectional view of a seal-forming apparatus in which the right half (not shown) is a mirror image of that shown in FIG. 1. The major elements of molding assembly 10 include an upper plate generally indicated at 14, a lower plate generally indicated at 16, an annular floating casing-engaging ring, generally indicated at 18, biasing means generally indicated at 20, and vacuum means generally indicated at 22, which includes connecting conduit such as flexible hose 23. Seated sealing ring 24 is disposed in recess 26 to provide an air tight seal between bottom plate 12 and floating ring 18. Ring 24 is preferably teflon or other similar low friction material.

The seal-forming molding assembly 10 includes conventional centering means, generally indicated at 25, for maintaining concentricity of upper plate 14 and lower plate 16. Bottom plate 16 includes a raised central portion 26 and an outer radial flange-like base 28. Upper plate 14 is formed with a radially extending top portion 30 with an annular depending portion 32. Depending portion 32 terminates with annular planar surface 34.

Floating member 18 includes upper radially inwardly extending portion 36 and dependent skirt portion 38. It will be noted that dependent skirt portion 38 is of substantial thickness, but is not as thick as upper radially extending portion 36, with the result that radially inwardly extending flange-like portion 40 of upper portion 36 extends over biasing means, for example spring 20 and bears against it. The top face 42 of upper portion 36 of floating member 18 is disposed to be axially aligned with some or all of face 34 of dependent portion 32 of upper plate 14. Bottom 44 of dependent skirt portion 38 is disposed to be axially aligned with flange-like base 28 of lower plate 16. It will be noted that dependent skirt portion 38 is of substantial thickness, but is not as thick as upper radially extending portion 36, with the result that radially inwardly extending flange-like portion 40 of upper portion 36 extends over biasing means, for example spring 20, and bears against it. The top face 42 of upper portion 36 of floating member 18 is disposed to be axially aligned with some or all of face 34 of dependent portion 32 of upper plate 14. Bottom 44 of dependent skirt portion 38 is disposed to be axially aligned with flange-like base 28 of lower plate 16.

Conventionally upper plate 14 is suitably attached to a reciprocating or stationary ram or shaft (not shown) for up and down movement, and lower plate 16 is fixed.

Spring 20 can be chosen with characteristics such that during the entire closed stroke top face 42 of sealing upper portion 36 of floating member 18, and bottom face 34 of depending portion 32 of upper plate 14 are urged against respective opposing surfaces of casing 46 with sufficient force to seal the interface therebetween against any passage of liquid moldable material therethrough, and yet with insufficient force to deform casing 46. Thus, in accordance with the present invention, a closed stroke can be achieved without the necessity of deforming the casing element positioned between mold cavity-forming elements which are moving, relatively speaking, towards each other. If any deformation should occur, it is in the form of some slight coining of the clamped section of the metal, such coining or the like not causing any dimensional change in the casing or stamping.

During operation of mold assembly 10, a casing 46 is placed on upper face 42 of floating ring 18 while upper plate 14 is in a moved-away position (not shown). Upper plate 14 is then moved axially to the position shown in FIG. 1 at which casing 46 is engaged between upper plate surface 34 and floating ring upper surface 42. Similarly, a predetermined quantity of moldable material 48, which is rubber or rubber-like stock material from which the flexible portion of the seal is to be shaped, is positioned on the top surface 50 of bottom plate 10. This material 48 is widely referred to as prep, in the industry. In FIG. 1, prep 48 is shown being squeezed against face 52.

Bottom plate 16 can be considered to have three distinct functioning outer surfaces, namely supply compression chamber surface 50, elevated orifice surface 54, and molding surface 56. Upper plate 14 can be considered as having three corresponding opposing surfaces, namely, supply compression chamber surface 52, elevated orifice surface 58 and molding or shaping surface 60. Thus surfaces 50 and 52 oppose each other, and define an annular supply compression chamber 62 which extends radially outwardly and then downwardly axially. It will be appreciated from the following description that surfaces 54 and 58 also come to closely oppose each other as top plate 14 moves axially downwardly over bottom plate 16.

Shaping surface 56, and opposite shaping surface 60 define most of the boundaries of mold cavity 64 which determines the shape and configuration of the flexible sealing element, and it will be appreciated that during the closed stroke, the shape and configuration of cavity 64 changes continuously, generally decreasing in volume.

The lowermost portion of orifice surface 58 is at a level indicated by the line identified by the letter $a$ in FIG. 1. At that same instant in time, face 42 is at the level $b$, and lower edge 44 of clamping ring 18 is at level $c$. Thus, the situation illustrated in FIG. 1, as indicated above, is the partially closed condition in which surfaces 58, 42, and 44 are at the level indicated at $a$, $b$, and $c$, respectively. The movement of top plate 14 continues axially downwardly, as viewed in the illustration of FIG. 1, until surfaces 58, 42, and 44 travel through the distance indicated at $d$ in FIG. 1 bringing those surfaces to the levels indicated by the letter $a'$, $b'$, and $c'$, in FIG. 1. At this stage, the elements are in the position illustrated in FIG. 3 which represents the fully closed condition.

Thus, as the axial movement of top plate 14 continues part way through the closed stroke, the condition illustrated in FIG. 2 is obtained. It will be noted that at the position shown in FIG. 2, clamping ring 18 has traveled downwardly against the bias of springs 20, to the extent that conduit 66 has traveled below shaping surface 56, so that there is no longer a gas conduit entryway available to the shaping cavity 64 defined by surfaces 56, 60.

Continued axially downward travel of top plate 14 forces clamping ring 18 downwardly bringing its lowermost surface 44 against radially outwardly extending flange portion 28, and this condition, which is illustrated in FIG. 3, is referred to as "bottoming out". It will be noted that, in the illustration of FIG. 3, conduit 66 has traveled downwardly and is pneumatically sealed against gasket 24. Casing 46 remains tightly squeezed between upper surface 42 of clamping ring 18 and lower surface 34 of top plate 14. In the configuration of FIG. 3, prep 48 has filled cavity 64 and is under extremely high compressive condition. It should be noted that commercially used prep is substantially non-compressible. It will be noted from a consideration of FIG. 3 that, in the bottomed out condition shown in FIG. 3, orifice surfaces 54 and 58 are no longer widely spaced apart, but are very closely adjacent to define a relatively narrow orifice or passageway therebetween, with the result that the prep 48 within shaping chamber 64 can be subjected to highly pressurized conditions as the molding assembly 10 bottoms out.

Another highly advantageous result which is achieved by the molding assembly 10 which also includes the relatively narrow annular orifice between surfaces 54, and 58 is the fact that the extremely thin configuration of the annular plastic moldable material which is positioned therebetween during the final shaping and/or curing of the moldable material is readily frangible because of its thinness. This permits automatic separation of excess molding material remaining in the supply chamber and supply orifice from the mass of shaped, moldable material which constitutes the sealing element, upon separation of the upper and lower plates 14 and 16, respectively. In such an embodiment it is unnecessary to trim away excess moldable material, and in the industry, such an embodiment would be characterized as "trimless" molding, and the parts which are formed thereby would be referred to as trimless parts.

It will be appreciated from the foregoing description that the vacuum means 22 is not an absolutely essential feature for all embodiments of the present invention. It will be appreciated that, in the preferred embodiment illustrated in the figures the novel combination of the upper and lower plates with the annular clamping ring is indeed utilized to even greater advantage by positioning the vacuum conduit 66 to pass through annular clamping ring 18 and connect with chamber 64 at such a point on inner surface 66 that chamber 64 can be gas evacuated by conventional vacuum means as soon as casing 46 is clamped between upper plate 14 and lower plate 16. Furthermore, it will be appreciated that the removal of gas, usually air, trapped within chamber 64 during the closed stroke, and while prep 48 is being squeezed into chamber 64, greatly assists in and facilitates the distribution of prep 48 within forming chamber 64. It will also be appreciated that access to the vacuum conduit 66 is automatically discontinued as soon as annular clamping ring 18 travels downwardly to the approximate position illustrated in FIG. 2. Thus, automatic protection or shielding of the vacuum system is achieved in accordance with the preferred illustrated embodiment.

Furthermore, the particularly preferred embodiment illustrated in the accompanying drawings involves a combination in which the part of the supply compression chamber 62 which extends in a substantially axial direction has a configuration such that the axially extending portion is relatively wide during the initial stage of the prep flow, and is relatively narrow during the final stage of the closed stroke, which combination also includes the clamping ring 18 which cooperates with the particular supply chamber configuration to provide improved molding. This particular combination achieves an interaction and cooperation between the various aspects of the invention which are particularly advantageous with respect to the then prevailing transitory and momentary physical characteristics, particularly the rheological characteristics, of the prep. For example, in the initial stage of the closed stroke, the relatively wide axially extending supply chamber provides a broad unobstructed avenue through which much prep can be quickly charged to shaping cavity 64. The result is that much of prep 48 is transferred very quickly into chamber 64. The resulting rapid flow of prep 48 into cavity 64 also, because of the structural and spatial relationships obtained, results in a relatively large mass of material being moved with relatively diminished contact with heated surfaces or walls, during the early stages or prep transfer. This factor, combined with the rapid flow, provides reduced viscous heating of prep 48 during the flow. This reduced viscous heating facilitates accurate and complete shaping of the relatively low viscosity material in cavity 64 prior to substantial curing.

However, in the particularly preferred embodiment shown in the drawings, the combination also includes the automatically shielded vacuum assist mechanism. This particularly preferred combination achieves the same interaction and cooperation between the various aspects of the invention with respect to the transitory and momentary physical characteristics of the prep, and in addition, provides many additional advantages. For example, in the initial stage of the closed stroke, the relatively wide axially extending supply chamber functions cooperatively with the sudden reduction of atmospheric pressure within the cavity 64 to simultaneously foster maximum flow or transport of prep 48 during those moments in time in which the rheological characteristics of the prep are such that a relatively highly fluid condition exists. This results in even further improvement in the rapidity of the transfer of prep 48 into cavity 64. However, in addition to greatly facilitating the rapid transfer of prep 48 into shaping cavity 64, vacuum-evacuation of chamber 64 during these moments in time in which the prep 48 is being distributed throughout shaping chamber 64 provides several significant additional advantages. For example, any recessed area or shaping surface recess will be far more readily filled with prep 48 when chamber 64 is in a vacuum evacuated condition. Moreover, substantial elimination and withdrawal of gas from chamber 64 while prep 48 is flowing, better assures that prep 48 will remain free of trapped gas bubbles, and the flexible shaped article resulting therefrom will be free of bubbles, voids, and other discontinuities and structural defects which are a consequence of trapped air, or gases.

It is to be understood that the vacuum system 22 can be a conventional vacuum pump, or other well known vacuum source, and the system is preferably fitted to include a conventional surge tank, valve means and valve switch means for connecting the low pressure region of vacuum means 22 to chamber 64 as soon as the mold means close, and for disconnecting chamber 64 from vacuum means 22 before conduit 23 of the ring 18 moves clear of mold means 16.

It will be readily apparent to those skilled in the art that the apparatus and method of this invention is readily adaptable to a wide variety of applications without departing from the spirit or scope of the invention. Although the apparatus and method which is described in detail herein is a most preferred embodiment directed to the manufacture of seals, it will be readily apparent that the apparatus and method is applicable to a wide variety of closed stroke molding operations for the manufacture of a wide variety of articles. Furthermore, it is readily apparent that the method and apparatus is applicable to injection, compression and transfer molding operations. Therefore, the foregoing illustrative descriptions are not to be construed as limiting the invention, and the scope of the invention is to be determined from the following claims.

I claim:

1. A mold assembly for forming an insert molded article comprised of a relatively rigid insert element and a flexible body portion, said mold assembly comprising a first, fixed mold part having surfaces thereon defining at least a portion of a molding cavity, and second and third relatively movable mold parts, at least one of which includes surfaces thereon defining the remainder of said molding cavity, insert-receiving surfaces forming a part respectively of each of said second and third mold parts, means confining said second and third mold parts to a predetermined extent of movement along a given axis relative to said first part, spring means providing resistance to movement of said third part during one portion of said predetermined movement extent when said second and third mold parts move toward said fixed mold part, means for moving said second part away from said third part along said axis to open said second and third parts and to permit positioning of an insert element between said insert-receiving surfaces, and means for moving said second and third parts along said axis against the resistance of said spring while said insert is received between said second and third parts against the resistance of said spring.

2. A mold assembly as defined in claim 1 wherein said first and second mold parts include land surfaces positioned closely adjacent one another both axially and radially in one relative axial position of said first and second parts, said portions being spaced substantially axially apart from each other in another relative position of said first and second parts, whereby said lands combine to form a passage of reduced cross section in said molded article upon movement of said first and second mold parts to said one position wherein said lands are disposed closely adjacent each other.

3. A mold assembly as defined in claim 1 in which at least one vacuum passage means is provided in a portion of said third mold part for communication between said cavity formed by said surfaces and an exterior vacuum source, said third mold part being movable to a position wherein said passage means is positioned out of registry with the interior of said cavity, whereby a vacuum may be applied to said cavity during a portion of the movement of said third part and whereby material to be molded in said cavity is prevented from flowing into said passage in another position of said third part.

* * * * *

REEXAMINATION CERTIFICATE (224th)
United States Patent [19]
Christiansen et al.

[11] B1 3,936,257

[45] Certificate Issued Jul. 24, 1984

[54] CLOSED STROKE MOLDING

[75] Inventors: Keith W. Christiansen, Fox River Grove; Kare Andersen, Elgin, both of Ill.

[73] Assignee: Chicago Rawhide Manufacturing Company, Elgin, Ill.

Reexamination Request:
No. 90/000,002, Jul. 1, 1981

Reexamination Certificate for:
Patent No.: 3,936,257
Issued: Feb. 3, 1976
Appl. No.: 155,469
Filed: Jun. 22, 1971

[51] Int. Cl.³ .................................................. B29H 9/10
[52] U.S. Cl. ...................................... 425/125; 425/127; 425/DIG. 47
[58] Field of Search ............ 425/125, 127, 128, 129 R, 425/215, DIG. 42, DIG. 47, DIG. 60

[56] References Cited
U.S. PATENT DOCUMENTS

| | | | |
|---|---|---|---|
| 2,354,241 | 7/1944 | Anderson | 425/DIG. 42 |
| 2,962,761 | 12/1960 | Hobson | 425/DIG. 42 |
| 3,004,298 | 10/1961 | Haynie | 425/DIG. 47 |
| 3,315,316 | 4/1967 | Boney et al. | 425/215 |
| 3,392,226 | 7/1968 | McKinven | 425/DIG. 47 |
| 3,405,201 | 10/1968 | Roach | 425/DIG. 60 |
| 3,475,790 | 11/1969 | Bush et al. | 425/DIG. 47 |
| 3,536,806 | 10/1970 | Jackson | 425/DIG. 47 |
| 3,613,223 | 10/1971 | Bush | 425/DIG. 47 |

*Primary Examiner*—James B. Lowe

[57] ABSTRACT

An apparatus and method for molding an article such as finished seal of known type, comprising a flexible member bonded to a rigid element. During conventional manufacture, the rigid element is clamped between upper and lower seal-forming molding elements and, in many instances, after engagement of the rigid element, continued traveling of the upper and lower molding elements toward each other is used to provide a "closed stroke". In the closed stroke operation of the present invention, the continued traveling in the closed stroke stage requires no substantial deformation or shaping of the rigid element.

An apparatus and method is disclosed in which the molding elements include an outer movable, biased, annular casing engaging element, for example a ring, which is biased in an extended position. The ring is retractable against the bias during the continued travel of the molding elements in the closed stroke. The distance of relative travel of the retractable floating member is the distance of the closed stroke. In a particularly advantageous embodiment, the retraction of the floating element is utilized to even greater advantage in an apparatus which also provides a vacuum assist in filling the seal-shaping mold cavity, and which provides automatic protection of the vacuum system in the final stages of the filling of the mold cavity.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

New claims 4–6 are added and determined to be patentable.

*4. A mold assembly for forming an insert molded article comprised of a relatively rigid insert element and a flexible body portion, said mold assembly comprising a first, fixed mold part having surfaces thereon defining at least a portion of a molding cavity, and a radially outwardly directed cylindrical locating surface, and second and third mold parts, each of which is movable relative to said first, fixed mold part, at least one of said second and third mold parts including surfaces thereon defining the remainder of said molding cavity, said molding cavity including frusto-conical surfaces meeting to define a seal band area, said first mold part further having at least one surface lying outside the cavity-defining surfaces for receiving and positioning a charge of moldable material outside said molding cavity in the open position of said mold, said first mold part also including a passage-forming surface, said second mold part further including a passage-forming surface adapted, in the closed position of said mold parts, to cooperate with said passage-forming surface on said first mold part to define therebetween an annular passage of reduced cross section adapted to form a separable trim area spaced apart from said seal band area, insert receiving surfaces forming parts respectively of each of said second and third mold parts, means confining said second and third mold parts to a predetermined extent of movement along a given axis relative to said first part, spring means providing resistance to movement of said third part during one portion of said predetermined movement extent when said second and third mold parts move toward said fixed mold part, said third part having a radially inwardly directed cylindrical locating surface spaced by a working clearance from said radially outwardly directed locating counterpart surface of said first mold part, a major portion of said radially inwardly directed cylindrical surface being exposed to and forming a portion of the interior of said molding cavity in the open position of said third part, and a minor portion of said inwardly directed cylindrical surface being exposed to and forming a portion of said interior of said molding cavity in the closed position of said third molding part, whereby at least part of said inwardly directed cylindrical surface may be protected from exposure to fluent rubber when said mold parts are closed, means for moving said second part away from said third part along said axis to open said second and third parts and to permit positioning of an insert element between said insert-receiving surfaces, and means for moving said second and third parts along said axis against the resistance of said spring while said insert is received between said second and third parts and moved against the resistance of said spring.*

*5. A mold assembly as defined in claim 4 wherein at least one vacuum passage is provided in said cylindrical surface portion of said third mold part for communication with an exterior vacuum source, said passage being exposed to said interior of said cavity in said open position of said mold parts, said passage being constructed and arranged so as to be positioned out of registry with the interior of said cavity in said closed position of said mold, said mold assembly further including seal means disposed between said first and third mold parts to impede passage of moldable material from said cavity into said portion of said third mold member containing said vacuum passage in said closed position of said mold parts.*

*6. A mold assembly for forming an insert molded article comprised of a relatively rigid insert element and a flexible body portion, said mold assembly comprising a first, fixed mold part having surfaces thereon defining at least a portion of a molding cavity, and a portion of said cavity inlet, and second and third relatively movable mold parts, at least one of which includes surfaces thereon defining the remainder of said molding cavity, and said cavity inlet, insert receiving surfaces forming a part respectively of each of said second and third mold parts, said insert receiving surface on said third part having a horizontally extending portion for receiving a portion of the insert, said horizontal surface lying above the lowermost portion of the cavity defining surfaces of said first mold part in both open and closed positions of said third mold part, said third mold part also having a stop portion thereon, means confining said second and third mold parts to a predetermined extent of movement along a given axis relative to said first part, spring means providing resistance to movement of said third part during one portion of said predetermined movement extent when said second and third mold parts move toward said fixed mold part, means for moving said second part away from said third part along said axis to open said second and third parts and to permit positioning of an insert element between said insert-receiving surfaces, and means for moving said second and third parts along said axis against the resistance of said spring while said insert is received between said second and third parts, said mold assembly also having a bottom stop portion which is fixed in relation to said first fixed mold part and adapted to engage positively said stop portion of said third mold part and to serve as a movement-limiting stop therefor, whereby, when said second and third parts are moved along said axis against the resistance of said spring to a predetermined extent, said stop portion of said third part will engage said movement stop portion of said first part and prevent further movement of said second and third mold parts and said insert, said surfaces defining said cavity inlet and said insert receiving surfaces on said second and third mold parts being disposed at substantially opposite ends of said cavity.*

* * * * *